(12) United States Patent
Murakami et al.

(10) Patent No.: US 12,071,164 B2
(45) Date of Patent: Aug. 27, 2024

(54) CONTROL APPARATUS, SYSTEM, VEHICLE, AND CONTROL METHOD

(71) Applicant: TOYOTA JIDOSHA KABUSHIKI KAISHA, Toyota (JP)

(72) Inventors: Ryo Murakami, Susono (JP); Yuji Tachibana, Nisshin (JP); Minoru Nakadori, Toyota (JP); Daiki Kaneichi, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 17/555,984

(22) Filed: Dec. 20, 2021

(65) Prior Publication Data

US 2022/0281485 A1   Sep. 8, 2022

(30) Foreign Application Priority Data

Mar. 8, 2021   (JP) ................. 2021-036750

(51) Int. Cl.
*B60W 60/00* (2020.01)
*G01G 19/52* (2006.01)
*G06N 20/00* (2019.01)
*G06Q 50/40* (2024.01)
*G06V 10/70* (2022.01)
*G06V 10/80* (2022.01)
*G06V 20/58* (2022.01)
(Continued)

(52) U.S. Cl.
CPC ....... *B60W 60/00253* (2020.02); *G01G 19/52* (2013.01); *G06N 20/00* (2019.01); *G06Q 50/40* (2024.01); *G06V 10/809* (2022.01); *G06V 10/87* (2022.01); *G06V 20/58* (2022.01); *G06V 40/10* (2022.01); *G06V 40/20* (2022.01); *H04W 4/44* (2018.02); *B60W 2540/041* (2020.02); *B60W 2554/4029* (2020.02); *B60W 2554/4041* (2020.02); *B60W 2556/45* (2020.02)

(58) Field of Classification Search
None
See application file for complete search history.

(56) References Cited

U.S. PATENT DOCUMENTS

2006/0244403 A1   11/2006   Christensson et al.
2009/0091474 A1*   4/2009   Konforty ............... G08G 1/095
                                                    340/907
(Continued)

FOREIGN PATENT DOCUMENTS

JP   2006-268392 A   10/2006
JP   2019-057265 A   4/2019
(Continued)

*Primary Examiner* — Aniss Chad
*Assistant Examiner* — Jennifer M Anda
(74) *Attorney, Agent, or Firm* — Finnegan, Henderson, Farabow, Garrett, and Dunner, LLP (57) ABSTRACT

A control apparatus includes a communication unit configured to receive motion data indicating motion of at least one user outside a vehicle that moves along a route including at least one road, and a controller configured to make a boarding determination of determining whether the at least one user will board the vehicle based on the motion data received by the communication unit and execute, upon determining in the boarding determination that the at least one user will board the vehicle, control for opening a door of the vehicle.

12 Claims, 8 Drawing Sheets

(51) Int. Cl.
　　　*G06V 40/10*　　　(2022.01)
　　　*G06V 40/20*　　　(2022.01)
　　　*H04W 4/44*　　　(2018.01)

(56) References Cited

U.S. PATENT DOCUMENTS

| | | | |
|---|---|---|---|
| 2018/0068510 A1* | 3/2018 | Atsumi | B60R 25/25 |
| 2019/0304224 A1* | 10/2019 | Golsch | H04W 76/14 |
| 2020/0043344 A1 | 2/2020 | Shimizu et al. | |
| 2020/0074159 A1* | 3/2020 | Ohnishi | G06V 40/103 |
| 2020/0300027 A1* | 9/2020 | Brown | B60J 5/047 |
| 2020/0307514 A1 | 10/2020 | Yamane et al. | |
| 2021/0188325 A1* | 6/2021 | Ogura | G01C 21/3685 |
| 2022/0161818 A1* | 5/2022 | Solmaz | G08G 1/096725 |

FOREIGN PATENT DOCUMENTS

| | | |
|---|---|---|
| JP | 2020-038608 A | 3/2020 |
| JP | 2020-064570 A | 4/2020 |
| JP | 2020-157953 A | 10/2020 |
| JP | 2021-018578 A | 2/2021 |
| KR | 10-2012-0084928 A | 7/2012 |
| KR | 10-2019-0080253 A | 7/2019 |
| WO | WO 2018/037954 A1 | 3/2018 |

* cited by examiner

CONTROL APPARATUS, SYSTEM, VEHICLE, AND CONTROL METHOD

CROSS-REFERENCE TO RELATED APPLICATION

This application claims priority to Japanese Patent Application No. 2021-036750 filed on Mar. 8, 2021, incorporated herein by reference in its entirety.

BACKGROUND

1. Technical Field

The present disclosure relates to a control apparatus, a system, a vehicle, and a control method.

2. Description of Related Art

Japanese Unexamined Patent Application Publication No. 2020-038608 (JP 2020-038608 A) describes a technology for determining whether a user will board an autonomous driving vehicle by obtaining cooperation from a passenger of the vehicle.

SUMMARY

In the technology described in JP 2020-038608 A, it is not attempted to make a boarding determination as to whether the user will board the vehicle without obtaining cooperation from a passenger of the vehicle.

The present disclosure makes it possible to make a boarding determination as to whether a user will board a vehicle even without obtaining cooperation from a passenger of the vehicle.

A control apparatus according to a first aspect of the present disclosure includes a communication unit configured to receive motion data indicating motion of at least one user outside a vehicle that moves along a route including at least one road, and a controller configured to make a boarding determination of determining whether the at least one user is to board the vehicle based on the motion data received by the communication unit and, upon determining in the boarding determination that the at least one user is to board the vehicle, execute control for opening a door of the vehicle.

In the first aspect, the communication unit may be configured to receive an image of the at least one user as the motion data. The controller may be configured to make the boarding determination by analyzing the received image.

In the first aspect, the communication unit may be configured to receive the image from an image capturing device mounted on the vehicle.

In the first aspect, the communication unit may be configured to receive position information indicating positions of the at least one user at a plurality of time points as the motion data. The controller may be configured to make the boarding determination by analyzing a change in the positions indicated in the received position information.

In the first aspect, two or more weight sensors may be installed on a road surface of the road. The communication unit may be configured to receive, as the position information, information indicating a position of a weight sensor that detects a weight of the at least one user from among the two or more weight sensors, from the weight sensor.

In the first aspect, the communication unit may be configured to receive the position information from a terminal device held by the at least one user.

In the first aspect, the controller may be configured to transmit the motion data to a traveling management apparatus provided outside the control apparatus via the communication unit, receive, from the traveling management apparatus, a result of an administrator's determination as to whether the at least one user is to board the vehicle via the communication unit, and execute, when the controller determines in the boarding determination that whether the at least one user is to board the vehicle is uncertain, the control for opening the door of the vehicle in a case where the received result indicates that the at least one user is to board the vehicle.

In the first aspect, the controller may be configured to make the boarding determination by calculating a probability that the at least one user is to board the vehicle and determine that whether the at least one user is to board the vehicle is uncertain when the calculated probability is lower than a first threshold value and equal to or higher than a second threshold value. The second threshold value is lower than the first threshold value.

In the first aspect, the controller may be configured to calculate the probability using machine learning.

In the first aspect, the controller may be further configured to present traveling information indicating the route and a position of the vehicle to a passenger aboard the vehicle.

In the first aspect, the controller may be configured to present the traveling information via a display installed inside the vehicle, receive a vehicle exit request that is input by the passenger, and execute the control for opening the door of the vehicle at a corresponding point in response to the vehicle exit request.

In the first aspect, the controller may be configured to present the traveling information via a terminal device held by the passenger, receive a vehicle exit request that is input to the terminal device by the passenger, and execute the control for opening the door of the vehicle at a corresponding point in response to the vehicle exit request.

A system according to a second aspect of the present disclosure includes the control apparatus and a traveling management apparatus configured to communicate with the control apparatus.

In the second aspect, the traveling management apparatus may be configured to present, upon receiving motion data from the control apparatus, the motion data to an administrator and receive, from the administrator, an input of the result of the administrator's determination as to whether the at least one user is to board the vehicle and transmit the input result to the control apparatus.

A third aspect of the present disclosure is a vehicle that includes the control apparatus.

A control method according to a fourth aspect of the present disclosure includes a step of receiving, by a control apparatus, motion data indicating motion of at least one user outside a vehicle that moves along a route including at least one road, and a step of making, by the control apparatus, a boarding determination of determining whether the at least one user is to board the vehicle based on the received motion data and executing, by the control apparatus, upon determining in the boarding determination that the at least one user is to board the vehicle, control for opening a door of the vehicle.

In the fourth aspect, the step of receiving the motion data may include a step of receiving, by the control apparatus, an image of the at least one user, and the step of making the boarding determination may include a step of analyzing, by the control apparatus, the received image.

In the fourth aspect, the step of receiving the motion data may include a step of receiving, by the control apparatus, position information indicating positions of the at least one user at a plurality of time points, and the step of making the boarding determination may include a step of analyzing, by the control apparatus, a change in the positions indicated by the received position information.

In the fourth aspect, the control method may further include a step of transmitting, by the control apparatus, the motion data to a traveling management apparatus provided outside the control apparatus, a step of receiving, by the control apparatus, from the traveling management apparatus, a result of an administrator's determination as to whether the at least one user is to board the vehicle, and a step of executing, by the control apparatus, upon determining in the boarding determination that whether the at least one user is to board the vehicle is uncertain, the control for opening the door of the vehicle when the received result indicates that the at least one user is to board the vehicle.

In the fourth aspect, the control method may further include a step of presenting, by the control apparatus, traveling information indicating the route and a position of the vehicle to a passenger aboard the vehicle.

With each aspect of the present disclosure, it is possible to make a boarding determination as to whether a user boards a vehicle even without obtaining cooperation from a passenger of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, one embodiment of the present disclosure will be described with reference to drawings.

In each drawing, same or corresponding parts are designated by same reference signs. In the description of the present embodiment, the description will be omitted or simplified as appropriate for the same or corresponding parts.

Figure 1:
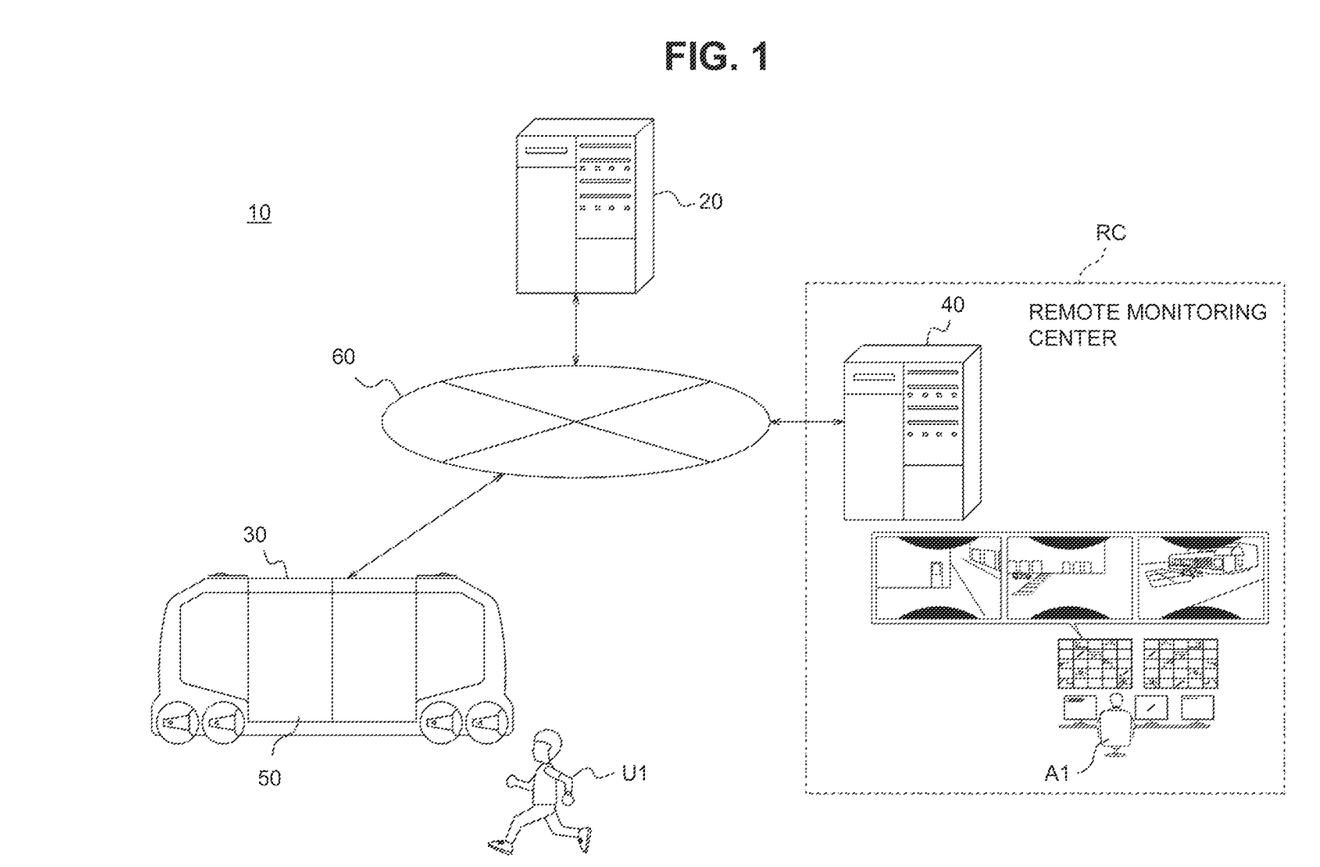
FIG. 1 is a diagram illustrating a configuration of a system according to an embodiment of the present disclosure.

A configuration of a system 10 according to the present embodiment will be described with reference to FIG. 1.

The system 10 according to the present embodiment includes at least one control apparatus 20, at least one vehicle 30, and at least one traveling management apparatus 40. The control apparatus 20 can communicate with the vehicle 30 and the traveling management apparatus 40 via a network 60. The vehicle 30 may be capable of communicating with the traveling management apparatus 40 via the network 60.

The control apparatus 20 is installed in a facility, such as a data center. The control apparatus 20 may be a computer, such as a server belonging to a cloud computing system or other computing systems.

The vehicle 30 may be any type of vehicle, such as a gasoline vehicle, a diesel vehicle, a hybrid vehicle (HV), a plug-in hybrid vehicle (PHV), an electric vehicle (EV) or a fuel cell vehicle (FCV). In the present embodiment, the vehicle 30 is an autonomous vehicle (AV) but it may be driven by a driver or driven at any level of automation. The level of automation may be, for example, one of Level 1 to Level 5 classified by the Society of Automotive Engineers (SAE) leveling. The vehicle 30 may be a vehicle dedicated to Mobility-as-a-Service (MaaS).

The traveling management apparatus 40 is installed in a facility, such as a data center. In the present embodiment, the traveling management apparatus 40 is installed in a remote monitoring center RC that remotely monitors the vehicle 30. The traveling management apparatus 40 may be a computer, such as a server belonging to a cloud computing system or other computing systems. In the present embodiment, in the remote monitoring center RC, a remote operator A1 as an administrator of the system 10 executes remote assistance for traveling of the vehicle 30.

The network 60 includes the Internet, at least one wide area network (WAN), at least one metropolitan area network (MAN), or a combination thereof. The network 60 may include at least one wireless network, at least one optical network, or a combination thereof. Examples of the wireless network include an ad-hoc network, a cellular network, a wireless local area network (LAN), a satellite communication network, or a terrestrial microwave network.

An overview of the present embodiment will be described with reference to FIG. 1.

In the present embodiment, the vehicle 30 may be a bus that transports one or more users. In the present embodiment, the user may be a resident, worker, or visitor of a smart city. The vehicle 30 travels along a route including one or more roads. In the present embodiment, the vehicle 30 travels as a regular fixed-route bus that travels by autonomous driving according to a traveling schedule set in advance. The traveling schedule of the vehicle 30 may be determined according to a time range and demand. The vehicle 30 stops at a stop provided on the route, and, upon determining that there is a user who will board the vehicle 30, opens its door 50. The vehicle 30 may stop at any point on the route. A traveling status of the vehicle 30 is confirmed by the remote operator A1 who is the administrator of the system 10. The remote operator A1 can remotely assist the traveling of the vehicle 30 by communicating with the vehicle 30 via the traveling management apparatus 40.

The control apparatus 20 receives motion data D1. The motion data D1 indicates motion of at least one user outside the vehicle 30. The outside of the vehicle 30 refers to an area around the vehicle 30. Specifically, the area around the vehicle 30 is an area within a certain distance L1 from the vehicle 30. In the present embodiment, the distance L1 may be set as any distance as long as it is a distance at which the user who intends to board the vehicle 30 can reach the vehicle 30 within a few minutes. For example, the distance L1 may be 40 m. The distance L1 may be a distance from a stop of the vehicle 30 or any point on the route of the vehicle 30. In an example of FIG. 1, it is assumed that a distance L2 from the vehicle 30 to a user U1 is, for example, 10 m. Therefore, the control apparatus 20 receives, as the motion data D1, data indicating motion of the user U1 as at least one user outside the vehicle 30.

The control apparatus 20 makes a boarding determination based on the received motion data D1. The boarding determination is a determination as to whether at least one user will board the vehicle 30. In the example of FIG. 1, it is assumed that the user U1 is approaching the vehicle 30. Therefore, the control apparatus 20 determines that the user U1 will board the vehicle 30 and executes control for opening the door 50 of the vehicle 30.

With the present embodiment, it is possible for the bus as the vehicle 30 to detect motion of a person outside the vehicle, determine whether the person will board the vehicle, and, upon determining that the person will board the vehicle, autonomously open its door 50. In the present embodiment, the determination as to whether a person will board the vehicle is made based on the motion data D1 of at least one user outside the vehicle 30. Therefore, it is possible to determine whether the user will board the vehicle 30 even without obtaining cooperation from a passenger of the vehicle 30.

Figure 2:
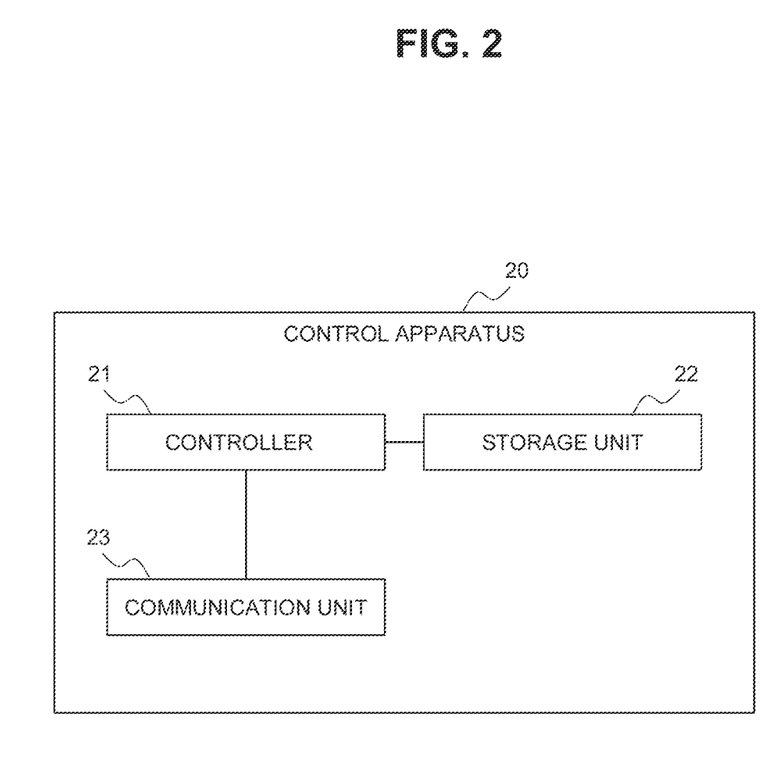
FIG. 2 is a block diagram illustrating a configuration of a control apparatus according to the embodiment of the present disclosure.

A configuration of the control apparatus 20 according to the present embodiment will be described with reference to FIG. 2.

The control apparatus 20 includes a controller 21, a storage unit 22, and a communication unit 23.

The controller 21 includes at least one processor, at least one programmable circuit, at least one dedicated circuit, or a combination thereof. The processor may be a general-purpose processor, such as a central processing unit (CPU) or a graphics processing unit (GPU), or a dedicated processor specialized for a specific process. Examples of the programmable circuit include a field-programmable gate array (FPGA). Examples of the dedicated circuit include an application specific integrated circuit (ASIC). The controller 21 executes processing for an operation of the control apparatus 20 while controlling each unit of the control apparatus 20.

The storage unit 22 includes at least one semiconductor memory, at least one magnetic memory, at least one optical memory, or a combination of at least two thereof. Examples of the semiconductor memory include a random access memory (RAM) or a read-only memory (ROM). Examples of the RAM include a static random access memory (SRAM) or a dynamic random access memory (DRAM). Examples of the ROM include an electrically erasable programmable read-only memory (EEPROM). The storage unit 22 functions as, for example, a primary storage device, a secondary storage device, or a cache memory. The storage unit 22 stores data used for the operation of the control apparatus 20 and data obtained by the operation of the control apparatus 20.

The communication unit 23 includes at least one communication interface. Examples of the communication interface include a LAN interface. The communication unit 23 receives the data used for the operation of the control apparatus 20 and transmits the data obtained by the operation of the control apparatus 20. In the present embodiment, the communication unit 23 communicates with the vehicle 30 and the traveling management apparatus 40.

The function of the control apparatus 20 is implemented when the processor as the controller 21 executes a control program according to the present embodiment. In other words, the function of the control apparatus 20 is implemented by software. The control program causes the computer to function as the control apparatus 20 by causing the computer to execute the operation of the control apparatus 20. In other words, the computer functions as the control apparatus 20 by executing the operation of the control apparatus 20 according to the control program.

The program can be stored on a non-transitory computer-readable medium. Examples of the non-transitory computer-readable medium include a flash memory, a magnetic recording device, an optical disk, a photo-magnetic recording medium, or a ROM. The program is distributed by selling, transferring, or renting a portable medium, such as a secure digital (SD) card, a digital versatile disc (DVD), or a compact disc read-only memory (CD-ROM) that stores the program. The program may be distributed by storing the program in a storage of a server and transferring the program from the server to another computer. The program may be provided as a program product.

The computer temporarily stores, for example, the program stored in the portable medium or the program transferred from the server in the primary storage device. Then, the computer reads the program stored in the primary storage device by the processor, and executes the processing according to the program read by the processor. The computer may read the program directly from the portable medium and execute the processing according to the program. The computer may sequentially execute the processing according to the received program each time the program is transferred from the server to the computer. The processing may be executed by a so-called application service provider (ASP) type service that implements the function only by an execution instruction and a result acquisition without transferring the program from the server to the computer. The program includes information used for processing by an electric calculator and equivalent to the program. For example, data that is not a direct command to a computer but has a property of defining the processing of the computer corresponds to "data equivalent to the program".

A part or all of functions of the control apparatus 20 may be implemented by a programmable circuit or a dedicated circuit as the controller 21. In other words, the part or all of the functions of the control apparatus 20 may be implemented by hardware.

Figure 3:
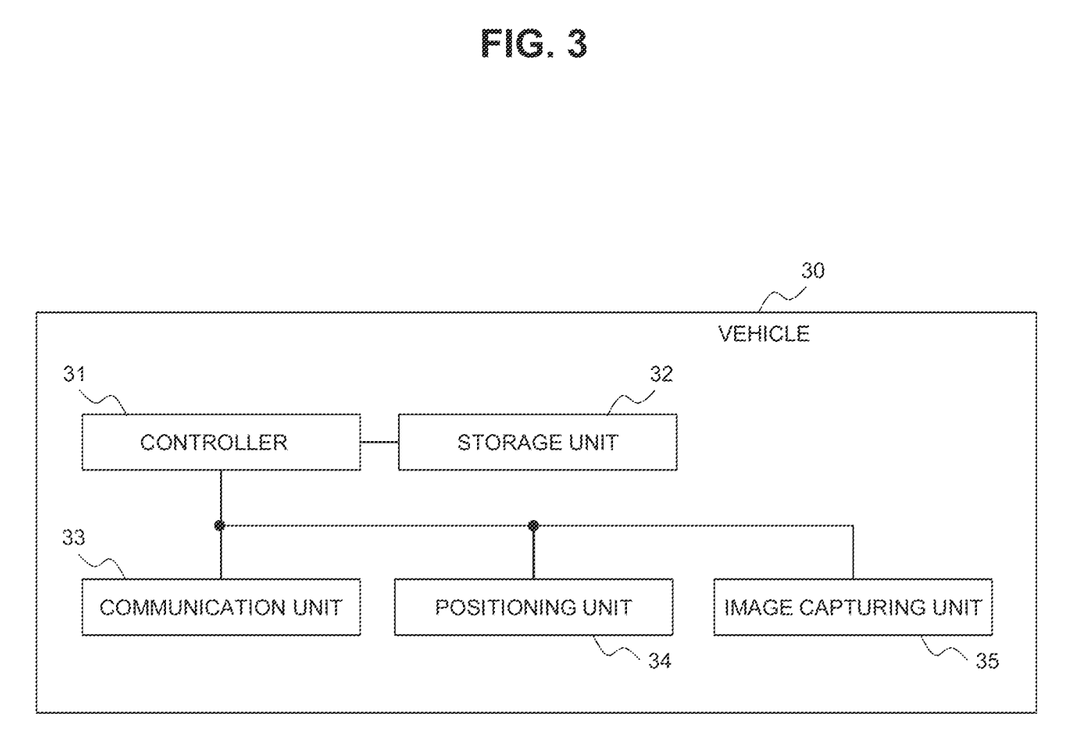
FIG. 3 is a block diagram illustrating a configuration of a vehicle according to the embodiment of the present disclosure.

A configuration of the vehicle 30 according to the present embodiment will be described with reference to FIG. 3.

The vehicle 30 includes a controller 31, a storage unit 32, a communication unit 33, a positioning unit 34, and an image capturing unit 35.

The controller 31 includes at least one processor, at least one programmable circuit, at least one dedicated circuit, at least one electronic control unit (ECU), or a combination thereof. The processor may be a general-purpose processor, such as a CPU or a GPU, or a dedicated processor specialized for a specific process. Examples of the programmable circuit include an FPGA. Examples of the dedicated circuit include an ASIC. The controller 31 executes processing for the operation of the vehicle 30 while controlling each functional component of the vehicle 30.

The storage unit 32 includes at least one semiconductor memory, at least one magnetic memory, at least one optical memory, or a combination of at least two thereof. Examples of the semiconductor memory include a RAM or a ROM. Examples of the RAM include an SRAM or a DRAM. Examples of the ROM include an EEPROM. The storage unit 32 functions as, for example, a primary storage device, a secondary storage device, or a cache memory. The storage unit 32 stores data used for the operation of the vehicle 30 and data obtained by the operation of the vehicle 30.

The communication unit 33 includes at least one communication interface. Examples of the communication interface include an interface corresponding to a mobile communication standard, such as Long-Term Evolution (LTE), Fourth generation (4G) standard, or Fifth generation (5G) standard, an interface corresponding to a near-field wireless communication standard, such as Bluetooth®, or a LAN interface. The communication unit 33 receives the data used for the operation of the vehicle 30 and transmits the data obtained by the operation of the vehicle 30. In the present embodiment, the communication unit 33 communicates with the control apparatus 20 and the traveling management apparatus 40.

The positioning unit 34 includes at least one global navigation satellite system (GNSS) receiver. Examples of the GNSS include the Global Positioning System (GPS), the Quasi-Zenith Satellite System (QZSS), BeiDou, Global Navigation Satellite System (GLONASS), or Galileo. A QZSS satellite is called a Quasi-Zenith Satellite. The positioning unit 34 measures a position of the vehicle 30.

The image capturing unit 35 includes an image capturing device that generates a captured image of a subject in the field of view. In the present embodiment, the image capturing unit 35 is mounted on the vehicle 30 as an internal image capturing device, but as a modified example of the present embodiment, the image capturing unit 35 may be connected to the vehicle 30 as an external image capturing device. In the present embodiment, the image capturing device may be a camera. The camera may be a monocular camera or a stereo camera. The camera includes an optical system, such as a lens, and an image capturing element, such as a charge-coupled device (CCD) image sensor or a complementary metal-oxide semiconductor (CMOS) image sensor. The image capturing unit 35 captures an image of the periphery of the vehicle 30. The image capturing unit 35 may continuously capture images at a predetermined frame rate, for example, 30 fps (frame per second).

Figure 4:
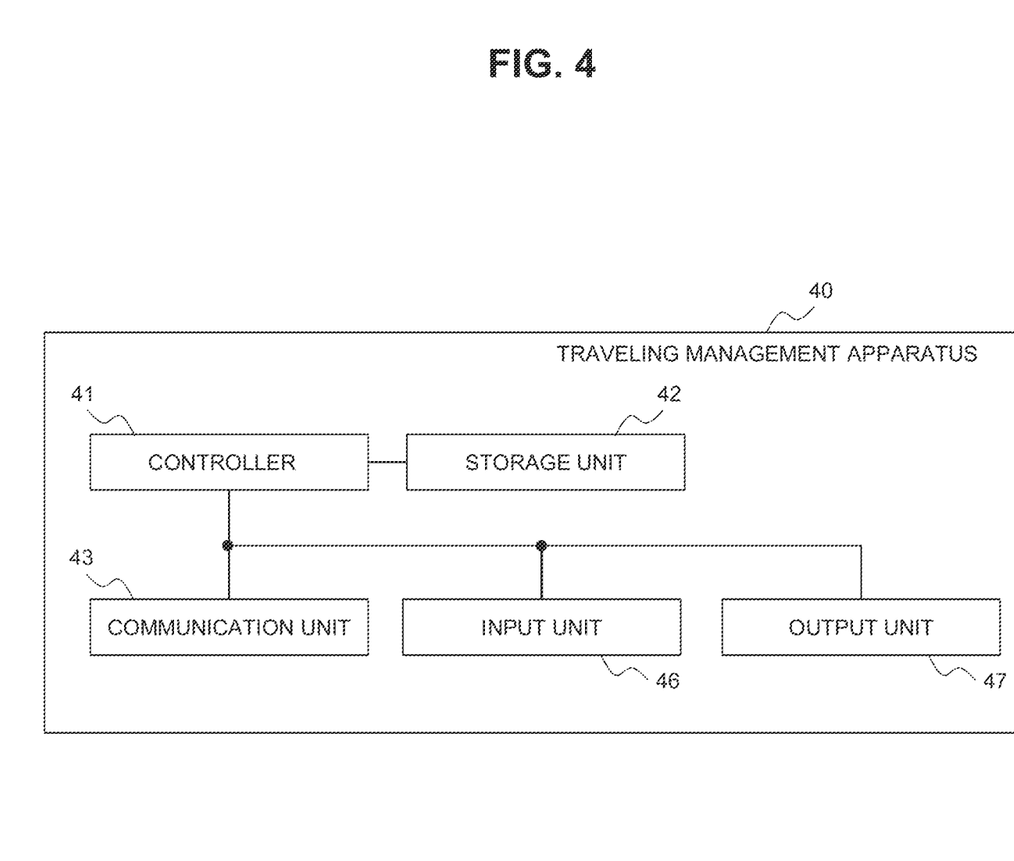
FIG. 4 is a block diagram illustrating a configuration of a traveling management apparatus according to the embodiment of the present disclosure.

A configuration of the traveling management apparatus 40 according to the present embodiment will be described with reference to FIG. 4.

The traveling management apparatus 40 includes a controller 41, a storage unit 42, a communication unit 43, an input unit 46, and an output unit 47.

The controller 41 includes at least one processor, at least one programmable circuit, at least one dedicated circuit, or a combination thereof. The processor may be a general-purpose processor, such as a CPU or a GPU, or a dedicated processor specialized for a specific process. Examples of the programmable circuit include an FPGA. Examples of the dedicated circuit include an ASIC. The controller 41 executes processing for an operation of the traveling management apparatus 40 while controlling each part of the traveling management apparatus 40.

The storage unit 42 includes at least one semiconductor memory, at least one magnetic memory, at least one optical memory, or a combination of at least two thereof. Examples of the semiconductor memory include a RAM or a ROM. Examples of the RAM include an SRAM or a DRAM. Examples of the ROM include an EEPROM. The storage unit 42 functions as, for example, a primary storage device, a secondary storage device, or a cache memory. The storage unit 42 stores data used for the operation of the traveling management apparatus 40 and data obtained by the operation of the traveling management apparatus 40.

The communication unit 43 includes at least one communication interface. Examples of the communication interface include a LAN interface. The communication unit 43 receives the data used for the operation of the traveling management apparatus 40, and transmits the data obtained by the operation of the traveling management apparatus 40. In the present embodiment, the communication unit 43 communicates with the control apparatus 20 and the vehicle 30.

The input unit 46 includes at least one input interface. Examples of the input interface include a physical key, a capacitive key, a pointing device, a touch screen integrated with the display, or a microphone. The input unit 46 accepts an operation where the administrator of the remote monitoring center RC inputs data indicating a determination result. The input unit 46 may be connected to the traveling management apparatus 40 as an external input device instead of being provided in the traveling management apparatus 40. As the connection method, any method, such as a Universal Serial Bus (USB), High-Definition Multimedia Interface (HDMI®), or Bluetooth®, can be used.

The output unit 47 includes at least one output interface. Examples of the output interface include a display or a speaker. Examples of the display include a liquid crystal display (LCD) or an organic electroluminescence (EL) display. The output unit 47 outputs the data received by the traveling management apparatus 40. The output unit 47 may be connected to the traveling management apparatus 40 as an external output device instead of being provided in the traveling management apparatus 40. As the connection method, any method, such as a USB, HDMI®, or Bluetooth®, can be used.

A function of the traveling management apparatus 40 is implemented when the processor as the controller 41 executes a traveling management program according to the present embodiment. In other words, the function of the traveling management apparatus 40 is implemented by software. The traveling management program causes the computer to function as the traveling management apparatus 40 by causing the computer to execute the operation of the traveling management apparatus 40. In other words, the computer functions as the traveling management apparatus 40 by executing the operation of the traveling management apparatus 40 according to the traveling management program.

A part or all of functions of the traveling management apparatus 40 may be implemented by a programmable circuit or a dedicated circuit as the controller 41. In other words, the part or all of the functions of the traveling management apparatus 40 may be implemented by hardware.

Figure 5:
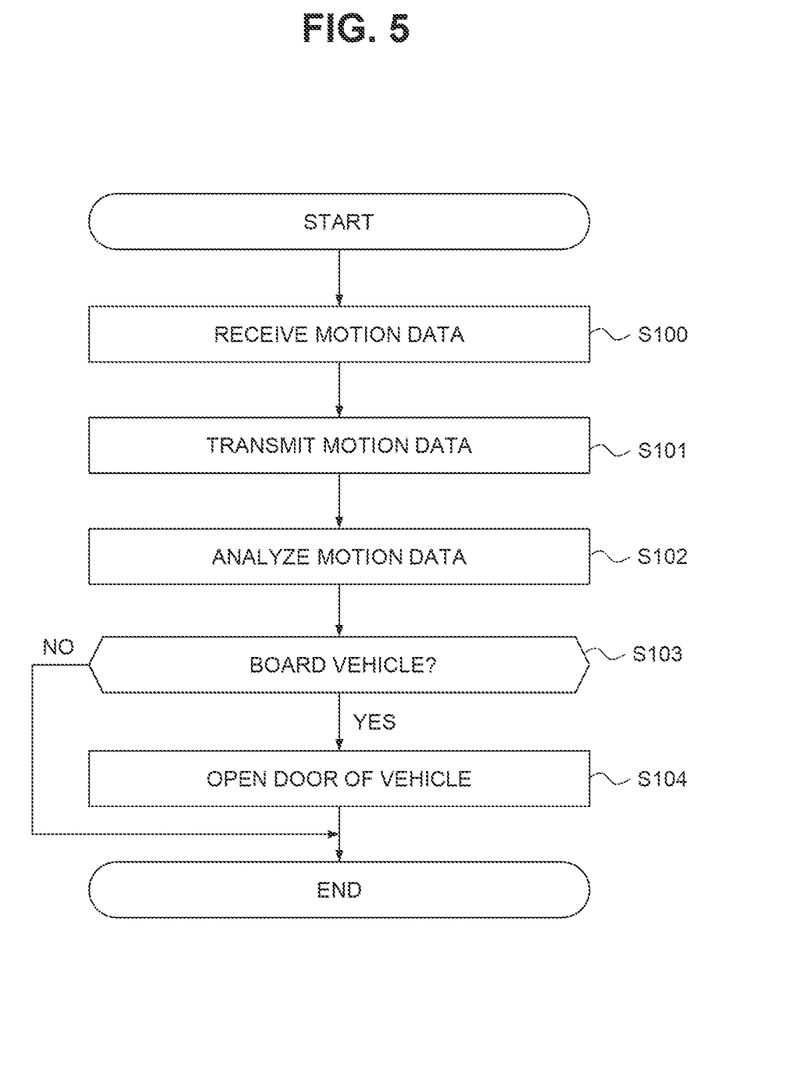
FIG. 5 is a flowchart illustrating an operation of the control apparatus according to the embodiment of the present disclosure.

An operation of the system 10 according to the present embodiment will be described with reference to FIG. 5. This operation corresponds to the control method according to the present embodiment. FIG. 5 illustrates the operation of the control apparatus 20.

In step S100, the communication unit 23 of the control apparatus 20 receives the motion data D1 indicating motion of at least one user U1 outside the vehicle 30. In the present embodiment, the communication unit 23 receives an image of the user U1 as the motion data D1. Specifically, the communication unit 23 receives the image of the user U1 captured by an image capturing device as the image capturing unit 35 of the vehicle 30 and transmitted from the image capturing device.

As a modified example of the present embodiment, in step S100, the communication unit 23 of the control apparatus 20 may receive, as the motion data D1, position information indicating positions of the user U1 at a plurality of time points instead of the image of the user U1. The positions may be represented by, for example, two-dimensional coordinates or three-dimensional coordinates. The position information may be received by any method. For example, the communication unit 23 may receive, as the position information, information indicating a position of a weight sensor that detects a weight of the user U1 from among two or more weight sensors provided on a road surface of a road and transmitted from the weight sensor. Specifically, the communication unit 23 may receive first position information PD1 indicating a position of a weight sensor that detects the weight of the user U1 at a first time point T1 and second position information PD2 indicating a position of a weight sensor that detects the weight of the user U1 at a second time point T2, which is after the first time point T1, from among the two or more weight sensors provided on the road surface of the road included in the route of the vehicle 30. Alternatively, the communication unit 23 may receive, as position information, information indicating a position of a terminal device held by the user U1 transmitted from the terminal device. Specifically, the communication unit 23 may receive, as the first position information PD1, position information transmitted from the terminal device of the user U1 at the first time point T1, and receive, as the second position information PD2, position information transmitted from the terminal device of the user U1 at the second time point T2.

In step S101, the controller 21 of the control apparatus 20 transmits the motion data D1 that is received in step S100 to the traveling management apparatus 40 provided outside the control apparatus 20 via the communication unit 23. By transmitting the motion data D1 to the traveling management apparatus 40, it is possible to cause the remote operator A1 as the administrator of the system 10 to make the boarding determination as described below. Therefore, when it is not necessary to cause the remote operator A1 to make a boarding determination, the process of step S101 may be omitted.

In steps S102 and S103, the controller 21 of the control apparatus 20 makes a boarding determination based on the motion data D1 that is received in step S100. The boarding determination is a determination as to whether the user U1 will board the vehicle 30.

In step S102, the controller 21 of the control apparatus 20 analyzes the motion data D1 that is received in step S100. In the present embodiment, the controller 21 of the control apparatus 20 analyzes the image of the user U1 that is received in step S100. As a method for analyzing the image, a well-known method can be used. Machine learning, such as deep learning, may be used. In the example of FIG. 1, as a result of analyzing the image of the user U1 as the motion data D1, the controller 21 determines that the user U1 is approaching the vehicle 30. Upon determining that the user U1 is approaching the vehicle 30, the controller 21 determines that the user U1 will board the vehicle 30. On the other hand, upon determining that the user U1 is not approaching the vehicle 30, the controller 21 determines that the user U1 will not board the vehicle 30.

As the modified example of the present embodiment, in step S100, upon receiving, as the motion data D1, the position information indicating the positions of the user U1 at the plurality of time points, the controller 21 of the control apparatus 20 may analyze changes in positions indicated by the received position information. As a method of analyzing the changes in the position, a well-known method can be used. Machine learning, such as deep learning, may be used. In this modified example, the controller 21 analyzes a change in the position indicated by the first position information PD1 and the position indicated by the second position information PD2. Specifically, the controller 21 compares a first distance from the position indicated by the first position information PD1 to the vehicle 30 with a second distance from the position indicated by the second position information PD2 to the vehicle 30. Then, when the second distance is shorter than the first distance, the controller 21 determines that the user U1 is approaching the vehicle 30. Alternatively, by calculating a motion vector of the user U1 based on a difference between coordinates indicated by the first position information PD1 and coordinates indicated by the second position information PD2, the controller 21 may determine whether the user U1 is approaching the vehicle 30.

In step S103, the controller 21 of the control apparatus 20 refers to the result of determining whether the user U1 will board the vehicle 30 in step S102. In step S102, upon determining that the user U1 will board the vehicle 30, the controller 21 executes the process of step S104. On the other hand, in step S102, upon determining that the user U1 will not board the vehicle 30, the controller 21 ends the process.

In step S104, the controller 21 of the control apparatus 20 executes control for opening the door 50 of the vehicle 30. Specifically, the controller 21 transmits a door open request for opening the door 50 to the vehicle 30 via the communication unit 23. Upon receiving the door open request from the control apparatus 20, the vehicle 30 opens its door 50.

As described above, in the present embodiment, the communication unit 23 of the control apparatus 20 receives the motion data D1 indicating the motion of the user U1 who is at least one user outside the vehicle 30 moving along the route including one or more roads. The controller 21 of the control apparatus 20 makes the boarding determination of determining whether the user U1 will board the vehicle 30 based on the motion data D1 that is received by the communication unit 23. In the boarding determination, upon determining that the user U1 will board the vehicle, the controller 21 executes the control for opening the door 50 of the vehicle 30. Therefore, with the present embodiment, it is possible to determine whether the user will board the vehicle 30 even without obtaining cooperation from a passenger of the vehicle 30.

In the present embodiment, the controller 21 of the control apparatus 20 analyzes the motion data D1 to determine whether the user U1 will board the vehicle 30. However, there is a case where it is not possible for the control apparatus 20 to determine whether the user U1 will board the vehicle 30 even when it knows from the motion data D1 that the user U1 is in the vicinity of the vehicle 30. For example, in a case where the user U1 who has stayed at a certain point suddenly rushes to the vehicle 30 just before a stop time of the vehicle 30, it is considered that the control apparatus 20 cannot determine the movement of the user U1 even when it analyzes the image of the user U1 as the motion data D1. As another case, it is considered that the user U1 is only heading for another destination and will not necessarily board the vehicle 30 even when the user U1 is approaching the vehicle 30. In such a case, when a person makes a determination, he/she can comprehensively determine whether the user U1 will board the vehicle 30 from a facial expression of the user U1 and other situations.

Therefore, as the modified example of the present embodiment, when it is uncertain whether the user U1 will board the vehicle 30, the control apparatus 20 may ask the remote monitoring center RC for a determination. Specifically, in step S102 of FIG. 5, when it is uncertain whether the user U1 is approaching the vehicle 30 as a result of analyzing the image of the user U1 as the motion data D1, the control apparatus 20 may determine that it is uncertain whether the user U1 will board the vehicle 30. In this modified example, the control apparatus 20 executes motion data D1 analysis processing using a method described below and calculates a probability that the user U1 will board the vehicle 30. Then, when the calculated probability is within a certain range, the control apparatus 20 determines that it is uncertain whether the user U1 will board the vehicle 30. In the remote monitoring center RC, when the motion data D1 or an explicit determination request including the motion data D1 is transmitted from the control apparatus 20, the remote operator A1 as the administrator of the system 10 remotely determines whether the user U1 will board the vehicle and sends a determination result to the control apparatus 20. Specifically, the traveling management apparatus 40 receives the motion data D1 that is transmitted by the control apparatus 20 in step S101 of FIG. 5. Upon receiving the motion data D1, the traveling management apparatus 40 presents the motion data D1 to the remote operator A1 as the administrator. The remote operator A1 determines whether the user U1 as at least one user will board the vehicle 30 and inputs the result to the traveling management apparatus 40. The traveling management apparatus 40 receives the input of the result and transmits the input result to the control apparatus 20. In the boarding determination, when it is determined that it is uncertain whether the user U1 who is at least one user will board the vehicle, the control apparatus 20 refers to the result of the determination made by the remote operator A1 as the administrator transmitted from the traveling management apparatus 40. When the result of the determination made by the remote operator A1 indicates that the user U1 will board the vehicle, the control apparatus 20 executes the control for opening the door 50 of the vehicle 30.

Figure 6:
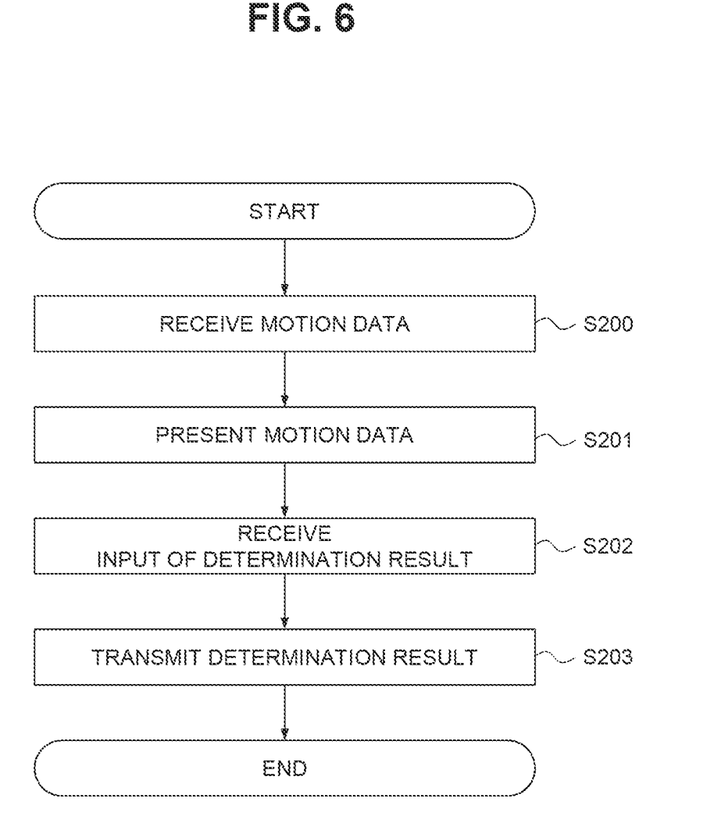
FIG. 6 is a flowchart illustrating an operation of the traveling management apparatus according to a modified example of the embodiment of the present disclosure.
Figure 7:
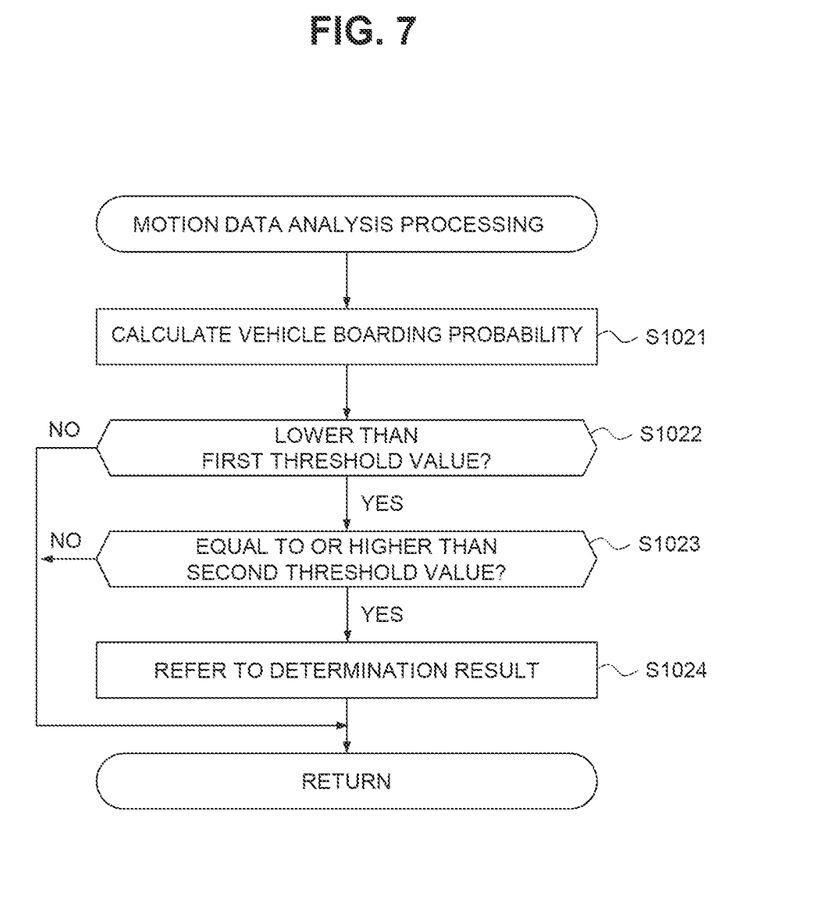
FIG. 7 is a flowchart illustrating motion data analysis processing according to the modified example of the embodiment of the present disclosure.

Details of this modified example will be described with reference to FIGS. 6 and 7.

The operation of the traveling management apparatus 40 in this modified example will be described with reference to FIG. 6.

In step S200, the communication unit 43 of the traveling management apparatus 40 receives the motion data D1 transmitted from the control apparatus 20 in step S101 of FIG. 5. In this modified example as well, the communication unit 43 receives the image of the user U1 as the motion data D1. The communication unit 43 may receive, as the motion data D1, the position information indicating the positions of the user U1 at the plurality of time points instead of the image of the user U1.

In step S201, the controller 41 of the traveling management apparatus 40 presents the motion data D1 to the administrator. Specifically, by displaying the image of the user U1 on a display as the output unit 47 of the traveling management apparatus 40, the controller 41 presents the image of the user U1 to the remote operator A1 as the administrator. The controller 41 may display the position information indicating the positions of the user U1 at the plurality of time points instead of the image of the user U1.

In step S202, the controller 41 of the traveling management apparatus 40 receives, from the administrator, the input of the result of the determination made by the administrator as to whether the user U1 will board the vehicle 30. Specifically, the remote operator A1 as the administrator of the system 10 visually determines whether the user U1 will board the vehicle 30 based on the image displayed on the display, and inputs the determination result via the input unit 46 of the traveling management apparatus 40. For example, an image shows the user U1 running toward the vehicle 30 while waving his/her hand, and as a result of visually confirming this, the administrator determines that the user U1 intends to board the vehicle 30. In this case, the administrator executes an operation of touching a "door open" icon displayed on a touch screen as the input unit 46. On the other hand, an image shows the user U1 is moving toward the vehicle 30 but is riding a bicycle, and as a result of visually confirming this, the administrator determines that the user U1 will not board the vehicle 30. In this case, the administrator executes an operation of touching a "door close" icon displayed on a touch screen as the input unit 46.

In step S203, the controller 41 of the traveling management apparatus 40 transmits the result that is input in step S202 to the control apparatus 20 via the communication unit 43. For example, in step S202, when the "door open" is touched, the controller 41 transmits, to the control apparatus 20, a determination result data D2 indicating that the administrator has determined that the user U1 will board the vehicle via the communication unit 43. In step S202, when the "door close" is touched, the controller 41 transmits, to the control apparatus 20, the determination result data D2 indicating that the administrator has determined that the user U1 will not board the vehicle via the communication unit 43. Upon receiving the determination result data D2 from the traveling management apparatus 40 via the communication unit 23, the control apparatus 20 stores the received determination result data D2 in the storage unit 22.

In this modified example, the following processing is executed as the analysis of the motion data D1 in step S102 of FIG. 5. Details of the motion data D1 analysis processing according to this modified example will be described with reference to FIG. 7.

In step S1021, the controller 21 of the control apparatus 20 calculates the probability that the user U1 will board the vehicle. The probability of boarding the vehicle may be calculated using any method, but in the present embodiment, the controller 21 calculates the probability using machine learning. Specifically, using machine learning, the controller 21 calculates a probability that the motion of the user U1 indicated by the motion data D1 belongs to a "vehicle boarding" class from among a plurality of classes. For example, by inputting the image of the user U1 as the motion data D1 to a classifier that has learned various human operations that occur around a bus, the controller 21 obtains a classification score of the "vehicle boarding" class as the probability that the user U1 will board the vehicle 30 from among a plurality of classification scores of the classes output from the classifier. By inputting the position information indicating the position of the user U1 as the motion data D1 to the classifier that has learned changes in human positions around the bus, the controller 21 may obtain the classification score of the "vehicle boarding" class as the probability that the user U1 will board the vehicle 30 from among the plurality of classification scores of the classes output from the classifier. The classifier is a learned model created in advance by machine learning, such as deep learning.

In step S1022, the controller 21 of the control apparatus 20 determines whether the probability calculated in step S1021 is lower than a first threshold value. In step S1023, the controller 21 of the control apparatus 20 determines whether the probability calculated in step S1021 is equal to or higher than a second threshold value, which is lower than the first threshold value. For example, the first threshold value is 70% and the second threshold value is 30%. When the probability is 70%, it is considered certain that the user U1 will board the vehicle. On the other hand, when the probability is lower than 30%, it is considered certain that the user U1 will not board the vehicle. Therefore, when the probability calculated in step S1021 is equal to or higher than the first threshold value, the controller 21 determines that the user U1 will board the vehicle. When the probability calculated in step S1021 is lower than the second threshold value, the controller 21 determines that the user U1 will not board the vehicle. When the probability calculated in step S1021 is lower than the first threshold value and equal to or higher than the second threshold value, which is lower than the first threshold value, the controller 21 determines that it is uncertain whether the user U1 will board the vehicle. When the calculated probability is not lower than the first threshold, that is, when the calculated probability is equal to or higher than the first threshold, the process returns to FIG. 5. When the calculated probability is not equal to or higher than the second threshold value, that is, when the calculated probability is lower than the second threshold value, the process returns to FIG. 5.

In step S1024, the controller 21 of the control apparatus 20 refers to the result that is received from the traveling management apparatus 40 and is determined by the administrator as to whether the user U1 will board the vehicle 30. Specifically, the controller 21 refers to the determination result data D2 stored in the storage unit 22.

Returning to FIG. 5, in step S103, the controller 21 of the control apparatus 20 refers to the result of determining whether the user U1 will board the vehicle 30 in step S102. In step S102, upon determining that the user U1 will board the vehicle 30, the controller 21 executes the process of step S104. In other words, when the probability that the user U1 will board the vehicle is 70% or higher, the controller 21 executes the process of step S104. On the other hand, in step S102, upon determining that the user U1 will not board the vehicle 30, the controller 21 ends the process. In other words, when the probability that the user U1 will board the vehicle is lower than 30%, the controller 21 ends the process. In step S102, even in the case where the controller 21 determines that it is uncertain whether the user U1 will board the vehicle, when it is determined in the determination result that is received from the traveling management apparatus 40 that the user U1 will board the vehicle 30, the controller 21 executes step S104. For example, when the probability is 60%, but the determination result data D2 indicates that the administrator has determined that the user U1 will board the vehicle, the controller 21 executes the process of step S104. In step S102, when it is determined that it is uncertain whether the user U1 will board the vehicle and it is determined in the determination result that is received from the traveling management apparatus 40 that the user U1 will not board the vehicle 30, the controller 21 ends the process. For example, when the probability is 60% and the determination result data D2 indicates that the administrator has determined that the user U1 will not board the vehicle, the controller 21 ends this process.

As described above, in this modified example, the controller 21 of the control apparatus 20 transmits the motion data D1 to the traveling management apparatus 40 provided outside the control apparatus 20 via the communication unit 23. The controller 21 receives, from the traveling management apparatus 40, the result of the administrator's determination as to whether at least one user will board the vehicle 30 via the communication unit 23. In the boarding determination, when it is determined that it is uncertain whether at least one user will board the vehicle, and the received result indicates that at least one user will board the vehicle, the controller 21 executes the control for opening the door 50 of the vehicle 30.

In this modified example, when it is difficult to determine whether a person will board the vehicle, the control apparatus 20 asks the remote monitoring center RC for a determination. In the remote monitoring center RC, the remote operator A1 as the administrator of the system 10 remotely determines whether a person will board the vehicle and sends a determination result to the control apparatus 20. Therefore, in the boarding determination by the control apparatus 20, when it is determined that it is uncertain whether at least one user will board the vehicle, the control apparatus 20 can make the boarding determination in cooperation with the remote monitoring center RC. As a result, it is possible to more reliably determine whether the user will board the vehicle 30 even without cooperation from a passenger of the vehicle 30.

As the modified example of the present embodiment, the controller 21 of the control apparatus 20 may present traveling information of the vehicle 30 to a passenger aboard the vehicle 30.

Figure 8:
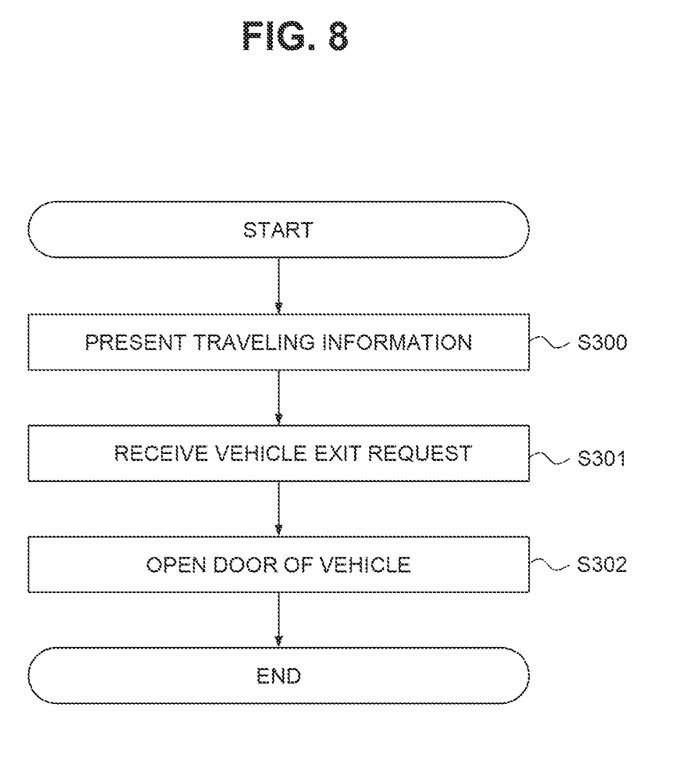
FIG. 8 is a flowchart illustrating an operation of the control apparatus according to the modified example of the embodiment of the present disclosure.

Details of this modified example will be described with reference to FIG. 8.

In step S300, the controller 21 of the control apparatus 20 presents the traveling information of the vehicle 30 to a passenger aboard the vehicle 30. The traveling information indicates the route of the vehicle 30 and the position of the vehicle 30. The traveling information may be acquired using any method. For example, it is acquired using the following method. In other words, the storage unit 22 of the control apparatus 20 may store in advance information indicating the route of the vehicle 30. The communication unit 23 of the control apparatus 20 may receive position information indicating a position measured by the positioning unit 34 of the vehicle 30. The controller 21 reads the information indicating the route of the vehicle 30 from the storage unit 22 and presents, as the traveling information of the vehicle 30, the route of the vehicle 30 indicated by the read information and the position of the vehicle 30 indicated by the position information that is received by the communication unit 23. The traveling information may be presented using any method. For example, it is presented using the following method. In other words, the controller 21 displays the route and the position of the vehicle 30 as the traveling information on the display installed inside the vehicle 30. Examples of the display include digital signage. Alternatively, the controller 21 may present the traveling information via a terminal device held by the passenger. In other words, the controller 21 may display the traveling information on a screen of the terminal device held by the passenger.

In step S301, the controller 21 of the control apparatus 20 receives a vehicle exit request that is input by the passenger. The vehicle exit request is information indicating a position of a point at which the passenger desires to exit the vehicle. The "point" may be, for example, a bus stop of the vehicle 30. Alternatively, the "point" may be any point on the route of the vehicle 30. The passenger can request for exiting the vehicle by pressing an "exit button" installed inside the vehicle 30. The "exit button" may be displayed on an application on the terminal device held by the passenger or on the digital signage installed inside the vehicle 30. In this case, the passenger may request for exiting the vehicle by touching the "exit button" displayed on the application or on the digital signage. The controller 21 receives the vehicle exit request that is input by the passenger. Specifically, when a certain passenger presses the "exit button", the controller 31 of the vehicle 30 transmits the vehicle exit request to the control apparatus 20 via the communication unit 33. The communication unit 23 of the control apparatus 20 receives the transmitted vehicle exit request. Alternatively, in the case where the passenger touches the "exit button" displayed on the application on the terminal device or on the digital signage of the vehicle 30, the vehicle exit request may be transmitted from the terminal device or the vehicle 30 to the control apparatus 20.

In step S302, in response to the vehicle exit request, the controller 21 of the control apparatus 20 executes the control for opening the door 50 of the vehicle 30 at a corresponding point. Specifically, when the vehicle 30 reaches the point corresponding to a position indicated in the vehicle exit request, the controller 21 transmits a door open request for opening the door 50 to the vehicle 30 via the communication unit 23. Alternatively, at a time point at which the vehicle exit request is received, the controller 21 may transmit, as the door open request, the request for opening the door 50 at the next stop at which the vehicle 30 stops the next time. When the vehicle 30 receives the door open request from the control apparatus 20, the vehicle 30 opens its door 50 according to the received request.

As described above, in this modified example, the controller 21 of the control apparatus 20 further presents the traveling information indicating a traveling route of the vehicle 30 and the position of the vehicle 30 to the passenger aboard the vehicle 30. In this example, the controller 21 presents the traveling information via a display installed inside the vehicle 30, receives the vehicle exit request that is input by the passenger, and, in response to the vehicle exit request, executes the control for opening the door 50 of the vehicle 30 at the corresponding point.

With the present embodiment, the passenger of the vehicle 30 can exit it at any point he/she desires. Therefore, the convenience of using the vehicle 30 for its passenger is enhanced.

The present disclosure is not limited to the embodiments described above. For example, a plurality of blocks described in the block diagram may be integrated, or one block may be divided. Instead of executing the plurality of steps described in the flowchart in chronological order according to the description, they may be executed in parallel or in different order according to the processing capacity of a device that executes each step, or as necessary. Other changes are also possible without departing from the scope of the present disclosure.

For example, at least a part of the operation of the control apparatus 20 may be executed by the vehicle 30. The control apparatus 20 may be integrated or mounted on the vehicle 30. In other words, the control apparatus 20 may be provided in the vehicle 30.

What is claimed is:

1. A control apparatus comprising:
a communication unit configured to receive motion data indicating motion of at least one user outside a vehicle, the vehicle moving along a route including at least one road; and
a controller, wherein the controller is configured to
transmit the motion data to a traveling management apparatus provided outside the control apparatus via the communication unit, an administrator of the traveling management apparatus visually determining whether the at least one user is to board the vehicle and inputting a determination result to the traveling management apparatus, and the determination result being sent to the control apparatus by the traveling management apparatus and stored in the control apparatus,
calculate a probability that the at least one user is to board the vehicle,
compare the calculated probability with a first threshold value and a second threshold value, the second threshold value being lower than the first threshold value, and
transmit a door open request to the vehicle via the communication unit
(i) in a case where the calculated probability is equal to or higher than the first threshold value, and
(ii) in a case where the calculated probability is lower than the first threshold value and equal to or higher than the second threshold value and the determination result indicates that the at least one user is to board the vehicle.

2. The control apparatus according to claim 1, wherein:
the communication unit is configured to receive an image of the at least one user as the motion data; and
the controller is configured to determine whether the at least one user is to board the vehicle by analyzing the received image.

3. The control apparatus according to claim 2, wherein the communication unit is configured to receive the image from an image capturing device mounted on the vehicle.

4. The control apparatus according to claim 1, wherein:
the communication unit is configured to receive position information indicating positions of the at least one user at a plurality of time points as the motion data; and
the controller is configured to determine whether the at least one user is to board the vehicle by analyzing a change in the positions indicated in the received position information.

5. The control apparatus according to claim 4, wherein:
the communication unit is configured to receive, as the position information, information indicating a position of a weight sensor that detects a weight of the at least one user from among two or more weight sensors, from the weight sensor, the two or more weight sensors being installed on a road surface of the road.

6. The control apparatus according to claim 4, wherein the communication unit is configured to receive the position information from a terminal device held by the at least one user.

7. The control apparatus according to claim 1, wherein the controller is configured to calculate the probability using machine learning.

8. The control apparatus according to claim 1, wherein the controller is further configured to present traveling information indicating the route and a position of the vehicle to a passenger aboard the vehicle.

9. The control apparatus according to claim 8, wherein the controller is configured to present the traveling information via a display installed inside the vehicle, receive a vehicle exit request that is input by the passenger, and open a door of the vehicle at a corresponding point in response to the vehicle exit request.

10. The control apparatus according to claim 8, wherein the controller is configured to present the traveling information via a terminal device held by the passenger, receive a vehicle exit request that is input to the terminal device by the passenger, and open a door of the vehicle at a corresponding point in response to the vehicle exit request.

11. The control apparatus according to claim 1, wherein the first threshold value is 70% and the second threshold value is 30%.

12. The control apparatus according to claim 1, wherein the controller is configured to transmit an image of the at least one user or position information indicating positions of the at least one user at a plurality of time points as the motion data to the traveling management apparatus.

* * * * *